United States Patent [19]

Keil

[11] 4,076,695

[45] Feb. 28, 1978

[54] SILICONE CONTAINING REACTION INJECTION MOLDED POLYURETHANES

[75] Inventor: Joseph W. Keil, Midland, Mich.

[73] Assignee: Dow Corning Corporation, Midland, Mich.

[21] Appl. No.: 766,176

[22] Filed: Feb. 7, 1977

[51] Int. Cl.² .............................................. C08G 18/30
[52] U.S. Cl. ......................... 260/77.5 AM; 260/46.5 R
[58] Field of Search .................. 260/46.5 R, 77.5 AM

[56] References Cited

U.S. PATENT DOCUMENTS

| | | | |
|---|---|---|---|
| 3,388,144 | 6/1968 | Musolf et al. | 260/77.5 AM |
| 3,856,756 | 12/1974 | Wagner et al. | 260/77.5 AM |
| 3,933,756 | 1/1976 | Wagner | 260/77.5 AM |
| 3,941,733 | 3/1976 | Chang | 260/77.5 AM |
| 3,954,824 | 5/1976 | Prokai et al. | 260/46.5 R |
| 3,979,344 | 9/1976 | Bryant et al. | 260/77.5 AM |

Primary Examiner—M. J. Welsh
Attorney, Agent, or Firm—Jack E. Moermond

[57] ABSTRACT

A reaction injection molding (RIM) process for making polyurethanes is disclosed where in addition to the conventional ingredients such as polyols, isocyanates, and catalysts there is included a carboxy functional siloxane. The incorporation of the carboxy functional siloxane aids in the release of the molded part and shortening the molding cycle time.

10 Claims, No Drawings

SILICONE CONTAINING REACTION INJECTION MOLDED POLYURETHANES

Reaction injection molding (RIM) processes can be characterized broadly as a combination of high pressure impingement mixing and rapid injection of liquid resin ingredients into molds, where the chemicals meet and cure quickly. These processes have also been called by those in the art by such names as liquid injection molding (LIM) and liquid reaction molding (LRM), and these terms or names are considered to be synonomous for the purposes of this application.

In the RIM processes the polyol, isocyanate and other ingredients are pumped from larger supply tanks into small mixing chambers where these ingredients impinge on one another at pressures usually in the range of 1500 to 3000 psi. The resulting mixture is then injected at relatively low pressures, generally in the range of 15 to 75 psi, through gates or sprues designed to provide additional mixing of the resin ingredients and to fill the mold cavity without undue agitation of the type which might cause voids in the part being made.

One reason for the interest in RIM systems is the energy savings possible. For example, in the RIM processes of this invention one is working with thermosetting polyurethane resin premixes instead of thermoplastic polyurethanes which must be polymerized before molding. Also, the use of liquid ingredients eliminates the necessity of an energy consuming plasticizing screw typical of a reciprocating screw injection molding operation. In addition, lower mold clamp pressures are needed with the RIM processes as compared with thermoplastic injection molding processes. There are other advantages to the RIM processes with which those skilled in the art are familiar.

RIM processes can be used to make a wide variety of products. For example, these processes have been used to make furniture, shoe soles and heels, industrial service parts such as rollers, gears, bearing pads, and pump housings, and automotive parts such as bumpers, fascia panels and fenders.

It has been discovered in accordance with the present invention that when certain carboxy functional siloxanes are incorporated into the thermosetting polyurethane compositions in a RIM process that better release of the molded part and shortening of the molding cycle can be achieved.

The particular polyols, isocyanates, catalysts and additives which are employed in the thermosetting polyurethane compositions used in RIM processes are well known to those skilled in the art and detailed elsewhere in the literature. Hence no time or space need be devoted here to a repetition of such information.

The carboxy functional siloxanes useful in the instant invention consist essentially of from 0.5 to 20 mole percent of $R_aR'_bSiO_{4-a-b/2}$ units and from 80 to 99.5 mole percent of $R''_cSiO_{4-c/2}$ units wherein R is a carboxy functional radical, $a$ has an average value from 1 to 3, R' is a hydrocarbon or substituted hydrocarbon radical, $b$ has an average value from 0 to 2, the sum of $a + b$ is from 1 to 3, R'' is a hydrocarbon or substituted hydrocarbon radical, and $c$ has an average value from 0 to 3.

In the above defined carboxy functional siloxanes the R radical can be any radical containing one or more —COOH groups and is attached to the silicon atom. While the particular means of attachment of the R radical to the silicon atom is not believed to be critical, for example attachment may be by means of Si—C or Si—O—C bonds, it is preferred that bonding be via a silicon-carbon bond. Particularly preferred R radicals are those of the formula HOOC-R'''— wherein R''' is a divalent linking group composed of carbon and hydrogen atoms; carbon, hydrogen and oxygen atoms; or carbon, hydrogen, and sulfur atoms. Specific examples of R''' include the methylene, ethylene, propylene, hexamethylene, decamethylene, —CH$_2$CH(CH$_3$)CH$_2$—, phenylene, naphthylene, —CH$_2$CH$_2$SCH$_2$CH$_2$—, —CH$_2$CH$_2$OCH$_2$—,

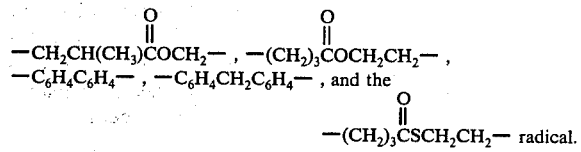

It is preferred that the R''' linking group contain from 2 to 10 carbon atoms. There can be an average of from 1 to 3 carboxy functional R radicals attached to the silicon atom, i.e., $a$ in the above formula has an average value of from 1 to 3. While the carboxy functional siloxane units can constitute from 0.5 to 20 mole percent of all the siloxane units, it is generally preferable that such units are present in the range of from 0.5 to 10 mole percent.

As indicated above, the R' radical can be any hydrocarbon or substituted hydrocarbon radical. Illustrative of the R' radicals that can be present are alkyl radicals such as the methyl, ethyl, propyl, butyl, amyl, hexyl, octyl, decyl, dodecyl, octadecyl, and myricyl radicals; alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha,alpha,alphatrifluorotolyl and the dichloroxenyl radicals; the corresponding cyanohydrocarbon radicals such as 2-cyanoethyl, 3-cyanopropyl and cyanophenyl radicals; the corresponding mercaptohydrocarbon radicals such as mercaptoethyl, mercaptopropyl, mercaptohexyl and mercaptophenyl; ether and ester hydrocarbon radicals such as —(CH$_2$)$_3$OC$_2$H$_5$, —(CH$_2$)$_3$OCH$_3$, —(CH$_2$)$_3$COOC$_2$H$_5$, and (CH$_2$)$_3$COOCH$_3$; the corresponding thioether and thioester hydrocarbon radicals such as —(CH$_2$)$_3$SC$_2$H$_5$ and —(CH$_2$)$_3$COSCH$_3$; and nitrohydrocarbon radicals such as the nitrophenyl and 3-nitropropyl radicals. It is preferred that the R' radical be a hydrocarbon radical containing from 1 to 18 carbon atoms. In the most preferred embodiment of this invention at least 90 percent of all the R' radicals are methyl radicals. There can be an average of from 0 to 2 R' radicals attached to the silicon atom, i.e., $b$ has an average of from 0 to 2 in the above formula.

The R'' radical in the carboxy functional siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., $c$ has an average value of from 0 to 3 in the above formula.

The carboxy functional siloxanes of this invention can be either solid or liquid in form. In order to use a solid carboxy functional siloxane it would be necessary to dissolve, disperse or suspend the siloxane in one of the polyurethane ingredients. Hence it is much preferred that the carboxy functional siloxane employed be in liquid form. While the viscosity of the liquid siloxane can vary over a wide range, for example from 1 to 1,000,000 cs., it is generally preferred that the viscosity be in the range of from 50 to 1000 cs.

The amount of carboxy functional siloxane of this invention incorporated into the polyurethane can vary from 0.25 to 5 percent by weight of the total polyurethane formulation. While the exact amount will necessarily be determined by individual process and manufacturing considerations, from 1 to 2 percent should satisfy most needs.

Now in order that those skilled in the art may better understand how the present invention can be practiced, the following examples are given by way of illustration and not by way of limitation. All parts and percents referred to herein are by weight, and all viscosities measured at 25° C. unless otherwise specified.

EXAMPLE 1

Two compositions were prepared which simulated the thermosetting polyurethane compositions used in RIM processes. The first composition, used as a control for comparative purposes, consisted of 100 parts of an isocyanate terminated polyurethane prepolymer having a viscosity of about 5000 cps. and about 5.5 percent of available NCO (Conathane TU-75 Part A) and 25 parts of a polyol having a viscosity of about 1400 cps. (Conathane TU-75 Part B). The second composition which represents the instant invention was identical to the first except that it also contained 2.5 parts of a carboxy functional siloxane composed of about 2 mole percent $HOOCCH_2SCH_2CH_2(CH_3)SiO$ units, about 96 mole percent $(CH_3)_2SiO$ units and about 2 mole percent $(CH_3)_3SiO_{1/2}$ units. This siloxane had an equivalent weight of about 4200, a specific gravity of 0.98 and a viscosity of about 250 cs.

The above compositions were coated onto aluminum panels, cured for 1 hour at 70° C. and then overnight at 100° C. The following day the peel strength of the coating was checked using the Keil Tester described in Tappi, Volume 43, Number 8, pages 164A-165A (August 1960). The control composition gave a release value of 1100g./in. whereas the composition of this invention gave a release value of zero g./in.

EXAMPLE 2

Two compositions were prepared as in the preceeding example. The control composition consisted of 100 parts of a methylene diphenyl isocyanate terminated polyurethane prepolymer (RF-1730 Part A) and 100 parts of a ricinoleate polyol (RF-1730 Part B).

The composition in accordance with this invention was identical to the control except that it also contained 4 parts of the carboxy functional siloxane used in Example 1.

The above compositions were coated onto aluminum panels, cured 2 hours at 70° C. and then overnight at 100° C. The peel strengths of the coatings were determined the following day as in the preceeding example. The control composition gave a release value of greater than 4000 g./in. whereas the other composition gave a release value of 400 g./in.

EXAMPLE 3

Two compositions were prepared as in Example 1. The control composition consisted of 93.5 parts of an isocyanate terminated polyester prepolymer containing about 12 percent methylene diphenyl isocyanate (Mobay F-242) and 6.5 parts of 2,4-butanediol. The composition of this invention was identical to the control except that it also contained 1.875 parts of the carboxy functional siloxane of Example 1.

The above compositions were coated onto aluminum panels, cured, and tested for peel strengths following the procedure of Example 1. The control composition gave a release value of 2000 g./in. while the composition of the instant invention gave a release value of 100 g./in.

EXAMPLE 4

A resin premix was prepared which consisted of 100 parts of a polyoxypropylene derivative of glycerine having a hydroxyl number of 25 (Wyandotte Pluracol 380), 20 parts of 1,4-butanediol, 0.5 part of triethylenediamine, 0.02 part of dibutyl tin dilaurate and varying amounts of the carboxy functional siloxane of Example 1. Hand mix studies were conducted using 100 g. of the foregoing premix and 76.7 g. of a methylene bisphenyl isocyanate adduct (Isonate 180) which is 105 Index (i.e., 105 percent) of the theoretical amount of isocyanate needed. These reactants were maintained at 85° F. and mixed on a roller mixer just prior to use.

A heavy-duty aluminum foil sheet was placed on the bottom of an 8 × 8 × 1/8 inch mold whose surface had been treated with a mold release agent. The above freshly mixed RIM thermosetting polyurethane composition was used to fill the mold, the mold closed, the composition cured at 140° F. (mold surface temperature) for four minutes, and the resulting part or plaque removed from the mold.

The plaque when removed from the mold had the aluminum foil sheet attached because it had not been treated with release agent. A ½ inch strip was sliced in the aluminum foil sheet and one end peeled back far enough to hook it to the Keil Tester. The strip was pulled at the rate of 0.5 cm./sec. with the adhesion value being reported in grams.

The results of various tests conducted using the above formulation are set forth in the graphs which follow. Graph I shows the effect of the concentration of the carboxy functional siloxane on adhesion values. Graph II shows the effect of mold (curing) temperature on adhesion values. Graph III shows the effect of the isocyanate index on adhesion values.

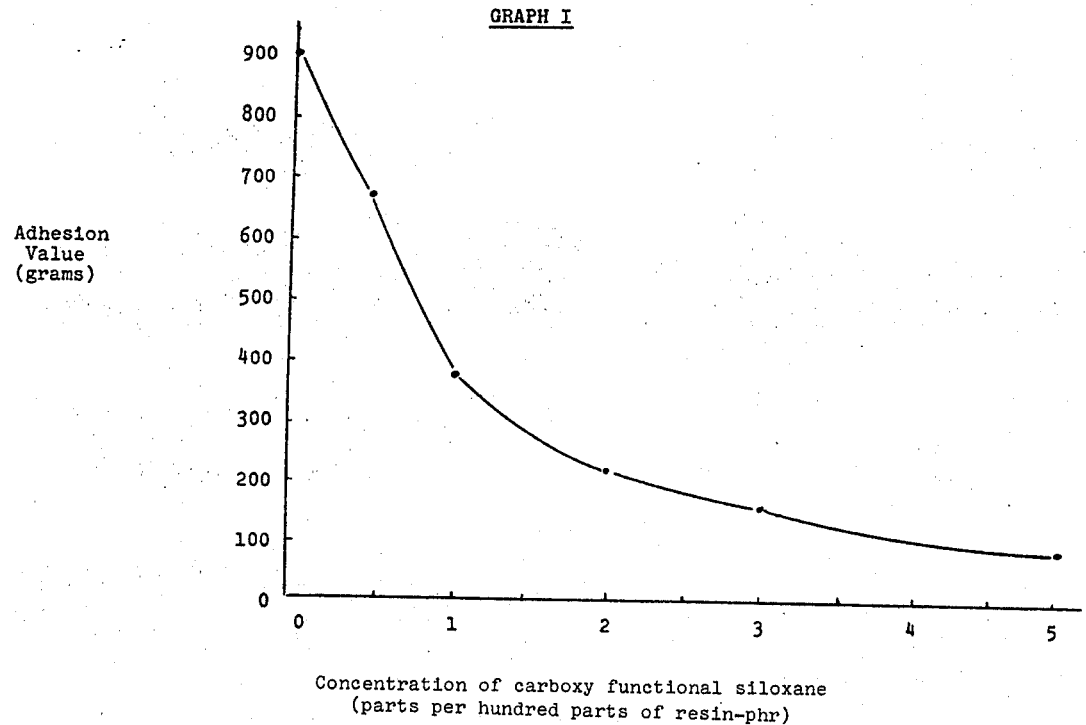
GRAPH I
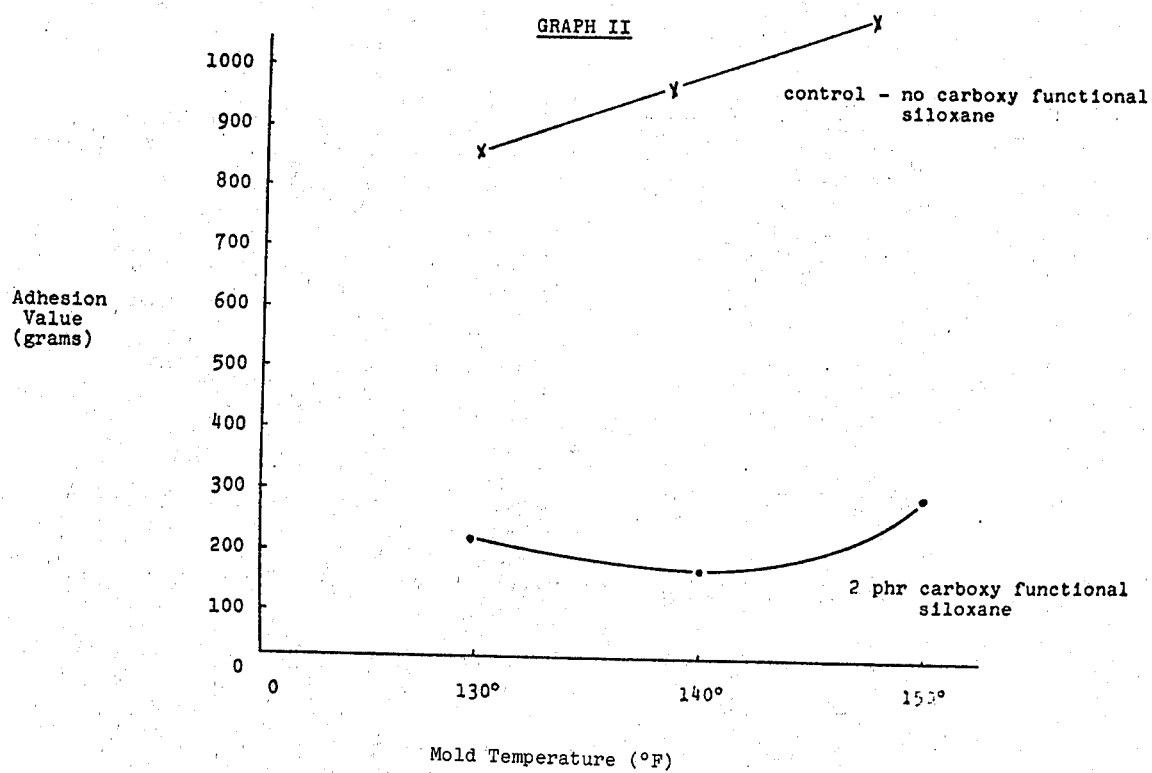
GRAPH II

GRAPH III

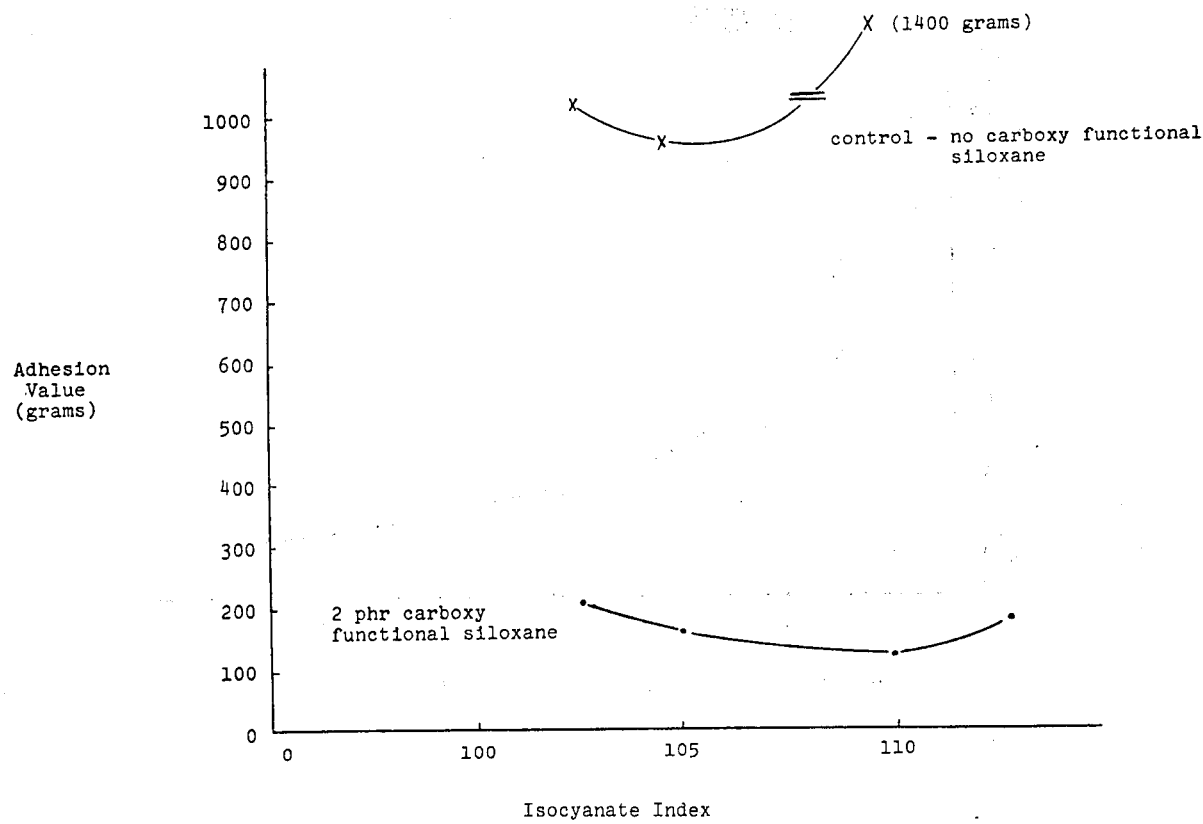

EXAMPLE 5

When the composition of the preceeding example is used in a conventional RIM process improved release of the thermoset polyurethane parts can be obtained.

That which is claimed is:

1. In a process of reaction injection molding of polyurethanes which include the mixing of one or more of each of polyols, polyisocyanates and catalysts, the reaction of the foregoing ingredients, and the molding and curing of the foregoing mixture into the desired configuration, the improvement comprising mixing with the other ingredients a carboxy functional siloxane.

2. A process as defined in claim 1 wherein the carboxy functional siloxane consists essentially of from 0.5 to 20 mole percent of $R_aR'_bSiO_{4-a-b/2}$ units and from 80 to 99.5 mole percent of $R''_cSiO_{4-c/2}$ units wherein R is a carboxy functional radical, $a$ has an average value from 1 to 3, R' is a hydrocarbon or substituted hydrocarbon radical, $b$ has an average value from 0 to 2, the sum of $a + b$ is from 1 to 3, R" is a hydrocarbon or substituted hydrocarbon radical, and $c$ has an average value from 0 to 3.

3. A process as defined in claim 2 wherein in the carboxy functional siloxane R is bonded to the silicon atom via a silicon-carbon bond, R' is a hydrocarbon racical containing from 1 to 18 carbon atoms, and R" is a hydrocarbon radical containing from 1 to 18 carbon atoms.

4. A process as defined in claim 3 wherein in the carboxy functional siloxane R is a radical of the formula HOOC-R'''- wherein R''' is a divalent linking group composed of carbon and hydrogen atoms; carbon, hydrogen and oxygen atoms; or carbon, hydrogen and sulfur atoms.

5. A process as defined in claim 4 wherein in the carboxy functional siloxane R''' is a divalent linking group composed of carbon and hydrogen atoms and contains from 2 to 10 carbon atoms, at least 90 percent of the R' radicals are methyl radicals, and at least 90 percent of the R" radicals are methyl radicals.

6. A process as defined in claim 5 wherein the carboxy functional siloxane is a liquid and all of the R' and R" radicals are methyl radicals.

7. A process as defined in claim 4 wherein in the carboxy functional siloxane R''' is a divalent linking group composed of carbon, hydrogen and oxygen atoms and contains from 2 to 10 carbon atoms, at least 90 percent of the R' radicals are methyl radicals, and at least 90 percent of the R" radicals are methyl radicals.

8. A process as defined in claim 7 wherein the carboxy functional siloxane is a liquid and all of the R' and R" radicals are methyl radicals.

9. A process as defined in claim 4 wherein in the carboxy functional siloxane R''' is a divalent linking group composed of carbon, hydrogen and sulfur atoms and contains from 2 to 10 carbon atoms, at least 90 percent of the R' radicals are methyl radicals, and at least 90 percent of the R" radicals are methyl radicals.

10. A process as defined in claim 9 wherein the carboxy functional siloxane is a liquid and all of R' and R" radicals are methyl radicals.

* * * * *